United States Patent
Kim et al.

(10) Patent No.: US 7,616,710 B2
(45) Date of Patent: Nov. 10, 2009

(54) FREQUENCY OFFSET ESTIMATING METHOD AND RECEIVER EMPLOYING THE SAME

(75) Inventors: Pan-Soo Kim, Daejon (KR); Yun-Jeoug Song, Daejon (KR); Byoung-Hak Kim, Daegu (KR); Deock-Gil Oh, Daejon (KR); Ho-Jin Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 600 days.

(21) Appl. No.: 11/297,257

(22) Filed: Dec. 7, 2005

(65) Prior Publication Data

US 2006/0146961 A1 Jul. 6, 2006

(30) Foreign Application Priority Data

Dec. 8, 2004 (KR) .................. 10-2004-0103061
Aug. 23, 2005 (KR) .................. 10-2005-0077356

(51) Int. Cl.
*H04L 27/14* (2006.01)
(52) U.S. Cl. ................................ 375/334
(58) Field of Classification Search ................ 375/334
See application file for complete search history.

(56) References Cited

OTHER PUBLICATIONS

Meyr, M. Moeneclaey, and S. A. Fechtel, "Digital Communication Receivers: Synchronization, Channel Estimation, and Signal Processing," John Wiley & Sons, Inc., N.Y. 1998, Chapter 9, pp. 505-532.*

* cited by examiner

*Primary Examiner*—Shuwang Liu
*Assistant Examiner*—Nader Bolourchi
(74) *Attorney, Agent, or Firm*—Blakely Sokoloff Taylor & Zafman

(57) ABSTRACT

Provided is a method for estimating carrier wave or doppler frequency offset based on an approximated quadratic non-linear function in fine search, and a receiver employing the method. The method for estimating frequency offset includes the steps of: a) extracting more than three discrete samples in an order where the discrete samples are close to a maximum value of a power spectrum density function; b) inducing a quadratic non-linear function by using the extracted discrete samples; and c) estimating the frequency offset from a maximum point of the quadratic non-linear function. The technology of the present research makes it possible to exactly estimate frequency offset without increasing hardware complexity in estimation of carrier wave or doppler frequency offset.

12 Claims, 4 Drawing Sheets

FREQUENCY OFFSET ESTIMATING METHOD AND RECEIVER EMPLOYING THE SAME

FIELD OF THE INVENTION

The present invention relates to a method for estimating frequency offset and a receiver employing the same; and, more particularly, to a method for estimating carrier wave or doppler frequency offset by using an approximated quadratic non-linear function in fine search and a receiver using the method.

DESCRIPTION OF RELATED ART

Generally, a receiver of a communication system down-converts a received Radio Frequency (RF) signal into a baseband signal through an RF module and an Intermediate Frequency (IF) module and restores an original signal in a demodulator.

Herein, a signal with carrier wave frequency offset generated due to incompleteness of an analog local oscillator used in the RF module and the IF module is inputted in the demodulator. Also, a signal with the doppler frequency offset, which is generated from motion of the receiver, is inputted in the demodulator. This interrupts normal restoration of the signal.

Therefore, the signal is restored after estimating the frequency offset through a frequency restoration circuit and removing the frequency offset in the demodulator. Generally, a Time Division Mutiple Access (TDMA) frequency offset estimating technique is divided into a forward technique and a backward technique.

According to the backward technique, Phase Locked Loop (PLL) should be designed to have a very low noise bandwidth to prevent deterioration of jitter performance in a low signal-to-noise ratio (SNR) environment. Herein, acquisition time for restoring the frequency offset can be indefinitely extended.

The forward technique is required to shorten the acquisition time. According to the forward technique, symbols are stored in a buffer and they are compensated after an error parameter is estimated. Therefore, a large number of memories and a lot of hardware operation quantity are required to improve performance. The forward frequency offset estimating technique can be divided into a correlation-based technique and a Discrete Fourier Transform (DFT)-based technique. It is considered that the DFT-based technique is superior to the correlation-based technique in the respect of exactness of an estimation value.

In a method suggested by Meyr in the DFT-based forward technique, approximated candidate maximum values are extracted in an approximated search procedure to estimate the carrier wave frequency offset in a baseband. The maximum value is extracted by a quadratic Cubic Lagrange interpolation technique in a fine search procedure and the frequency offset is corrected. This is revealed in an article entitled Digital Communication Receivers: Synchronization, Channel Estimation, and Signal Processing, by H. Meyr, M. Moeneclaey, and S. A. Fechtel, New York, N.Y.: John Wiley & Sons, Inc., 1998, pp. 514.

However, the above-mentioned technique requires a complicated operation process in a maximum value search procedure. Therefore, a frequency offset estimating technique that can be simply realized without performance deterioration in a low SNR while maintaining a wide frequency offset acquisition area, is required.

SUMMARY OF THE INVENTION

It is, therefore, an object of the present invention to provide a method for exactly and simply realizing the frequency offset by inducing an approximated quadratic non-linear function in a fine search after a coarse search in a frequency offset estimation procedure.

It is another object of the present invention is to provide a receiver using the method.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for estimating frequency offset in a communication system, including the steps of: a) extracting more than three discrete samples in an order where the discrete samples are close to a maximum value of a power spectrum density function; b) inducing a quadratic non-linear function by using the extracted discrete samples; and c) estimating the frequency offset from the maximum point of the quadratic non-linear function.

In accordance with another aspect of the present invention, there is provided a receiver of a communication system, including: a down-converter for down-converting a received RF signal into a baseband signal; and a demodulator for demodulating the baseband signal, wherein the demodulator block includes a frequency offset estimator for extracting more than three discrete samples in an order where the discrete samples are close to a maximum value of a power spectrum density function with respect to the baseband signal, and estimating frequency offset from a maximum point of the quadratic non-linear function induced based on the extracted discrete sample.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the points of the present invention, the detailed description will not be provided herein. The preferred embodiments of the present invention will be described in detail hereinafter with reference to the attached drawings.

Figure 1:
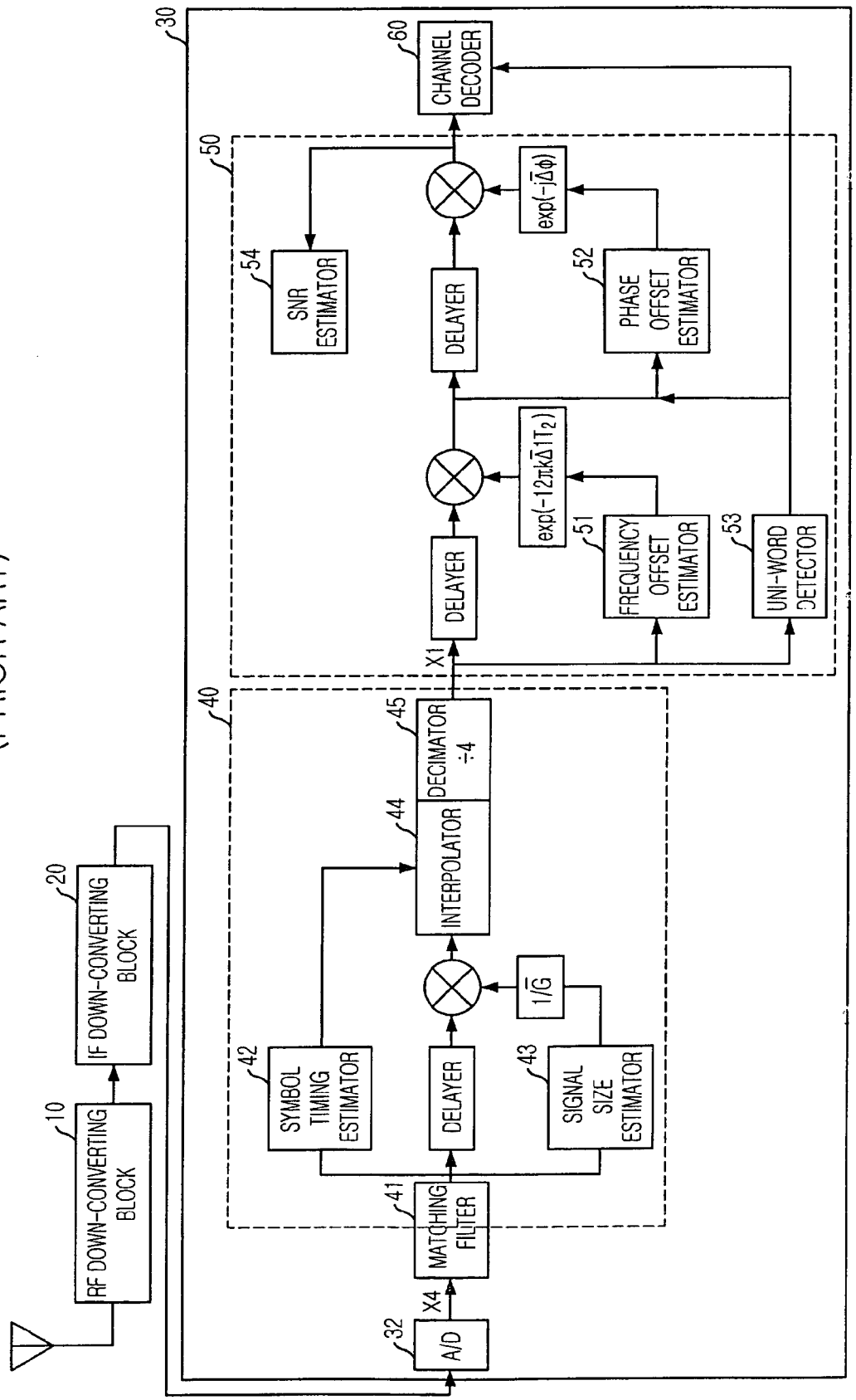
FIG. 1 is a block diagram showing a general receiver to which the present invention is applied.

FIG. 1 is a block diagram showing a general receiver, to which the present invention is applied.

A Radio Frequency (RF) reception signal is inputted into a demodulating block 30 after transformed into a baseband signal through an RF down-converting block 10 and an Intermediate Frequency (IF) down-converting block 20. A carrier wave frequency offset and a doppler frequency offset are generated due to unstableness of a local oscillator and movement of a receiver in the down-conversion.

The signal inputted into the demodulating block 30 is transformed into a digital signal by an analog digital transformer 32. The symbol restoration is performed on a digital input signal by a symbol restoring block 40 including a matching filter 41, a symbol timing estimator 42, a signal size estimator 43, an interpolator 44 and a decimator 45. That is, the digital input signal is inputted into a frequency/phase restoring block 50 after restoration of sampling timing and size.

The symbol restored signal is inputted into a channel decoder 60 after frequency restoration by the frequency restoring block 50 including a frequency offset estimator 51, a phase offset estimator 52, an uni-word detector 53 and an SNR estimator 54. The frequency restored signal passes an error correction procedure in the channel decoder 60 and finally decoded data are outputted into the channel decoder 60.

The present invention makes it possible to estimate a frequency offset quickly and briefly following a method different from the conventional method.

Figure 2:
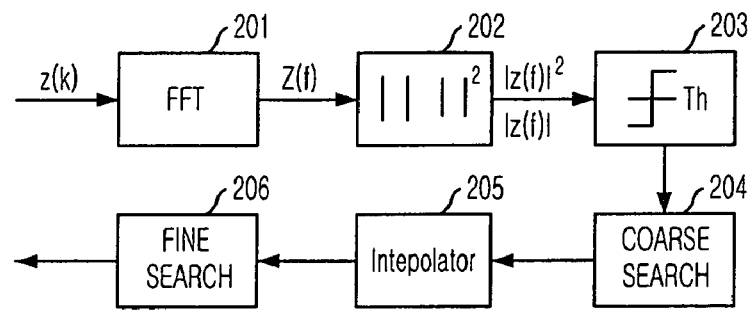
FIG. 2 is a flowchart showing a carrier wave frequency offset estimating procedure in accordance with an embodiment of the present invention.

FIG. 2 is a flowchart showing a carrier wave frequency offset estimating procedure in accordance with an embodiment of the present invention.

The carrier wave frequency offset estimating is performed by a hub or a demodulator in an inside of a receiver of a terminal. At step 201, a Discrete Fourier Transform (DFT) procedure, in particular, a Fast Fourier Transform (FFT) procedure is performed with respect to a signal z(k), in which a modulation component is removed, whereby a power spectrum density function z(f) of a frequency area is outputted.

At step 203, a critical value is applied to extract discrete samples larger than a regular size with respect to a value squaring a size of the outputted power spectrum density function z(f) at step 202. Squaring a size of the power spectrum density function is for easily identifying a pure signal element from noise, and the procedure squaring the size of the power spectrum density function is not necessary.

At step 204, discrete samples which have values larger than the critical value and are close to a maximum value are extracted by applying the critical value. The process is called a coarse search.

At step 205, when the value between discrete samples extracted by the interpolation filter, is interpolated, at step 206, a procedure detecting a maximum value with respect to the interpolated power spectrum density function is performed. The process is called a fine search.

The present invention extracts four discrete samples close to the maximum value of the power spectrum density function in the coarse search, and removes a discrete sample having a maximum value among four extracted discrete samples. A quadratic non-linear function passing all of three extracted discrete samples is induced with respect to the three extracted discrete samples. The present invention estimates the carrier wave frequency offset by detecting a maximum point of the quadratic non-linear function induced in the fine search.

That is, the present invention applies an interpolation filter, which has the quadratic non-linear function passing each sample, to the three discrete samples, in which the discrete sample having a maximum value among four discrete samples close to the maximum value of the power spectrum density function is removed, and simply estimates the carrier wave frequency offset by finding the maximum point of the induced quadratic non-linear function.

The above-mentioned procedure will be described in detail hereinafter.

A sine wave signal z(k), of which the modulation component is removed, and the power spectrum density of the frequency area, which is found after performing the FFT operation, are expressed as the equations 1 and 2. Herein, it is considered that a noise signal inputted with an original signal z(t) is omitted.

$$z(k) = e^{j(2\pi \Delta f_0 k T_s + \phi_0)} \quad \text{Eq. 1}$$

where $\Delta f_0$ is a carrier wave frequency offset and Ts is symbol duration time. $\phi_0$ is a carrier wave phase offset and k is a digital sample unit, which is a symbol unit operated based on one sample per one symbol.

$$|Z(f)|^2 = \left| \frac{1}{L_0} \sum_{k=0}^{L_0-1} z(k) e^{-j2\pi k f T} \right|^2 \quad \text{Eq. 2}$$

where $L_0$ is the number of estimating data symbols and a size of FFT.

Figure 3:
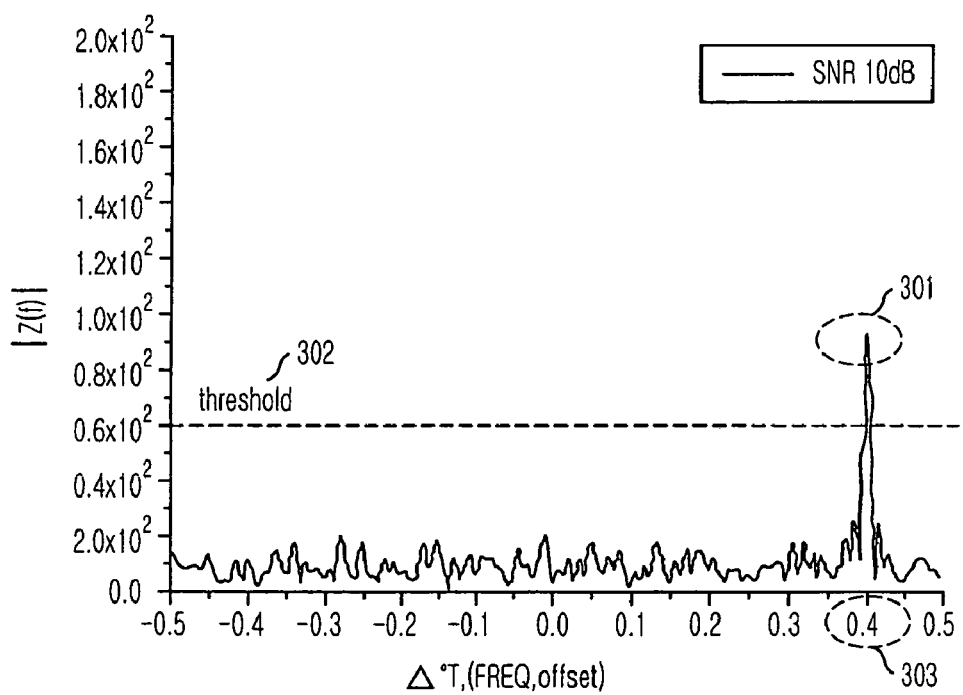
FIG. 3 is a graph showing a power spectrum density function based on a carrier wave frequency offset when a 256 FFT is performed with respect to a z(k)

FIG. 3 is a graph showing a power spectrum density function based on a carrier wave frequency offset when a 256 FFT is performed with respect to a z(k). A critical value 302 is applied to extract discrete samples 301 close to the maximum value of the power spectrum density function.

The critical value 302 is a value of a base. An estimated carrier wave frequency offset 303 is expressed on an X axis with respect to the maximum value point of the power spectrum density function.

Figure 4:
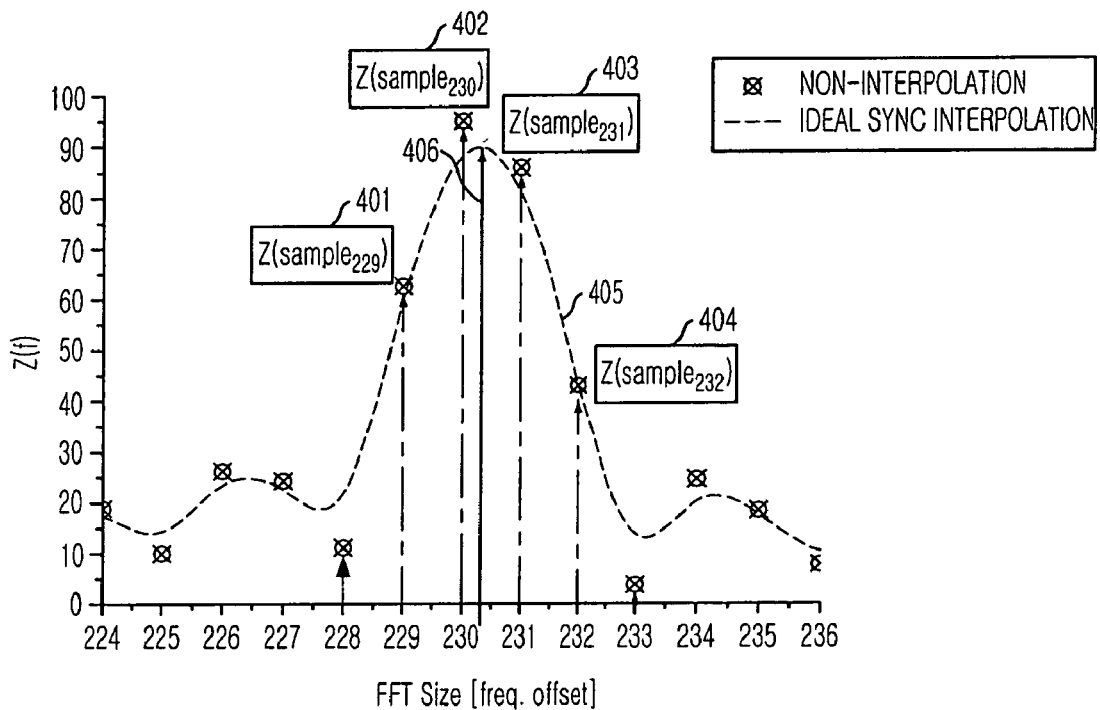
FIG. 4 is a graph showing discrete samples extracted in a coarse search procedure in accordance with the embodiment of the present invention.

FIG. 4 is a graph showing discrete samples extracted in a coarse search procedure in accordance with the embodiment of the present invention and the drawing shows a magnified discrete sample 301 of FIG. 3. Four discrete samples 410, 402, 403 and 404, which are close to the maximum value of the power spectrum density function in the coarse search procedure, are extracted.

A spline interpolated curve 405 is interpolating discrete samples, which are not interpolated, including the four discrete samples 410, 402, 403 and 404 as an ideal sync function. A point 406 having a maximum value in the curve 405 interpolated as the ideal sync function is an estimation value of a most exact frequency offset.

Many operations are required in a procedure searching the maximum value, but the maximum value is simply searched by using an approximated quadratic non-linear function in the present invention.

Figure 5:
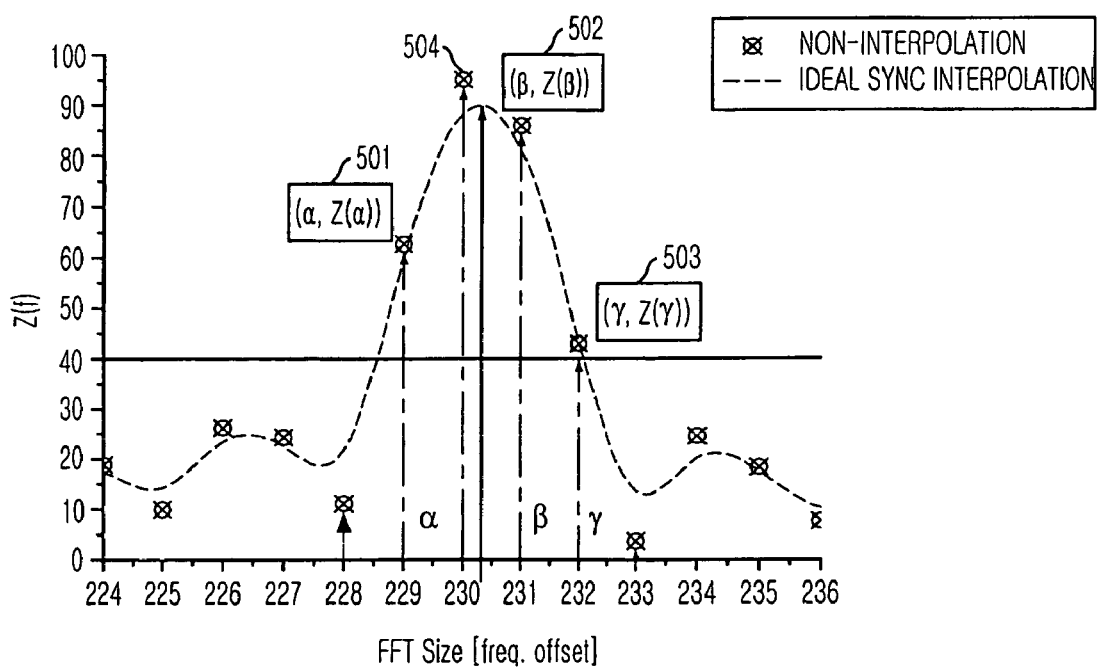
FIG. 5 is a graph showing a procedure inducing the approximated quadratic non-linear function in accordance with the embodiment of the present invention.

FIG. 5 is a graph showing a procedure inducing the approximated quadratic non-linear function in accordance with the embodiment of the present invention. An approximated quadratic non-linear function z(f) is induced by a method as the equation 3 with respect to three discrete samples 501, 502 and 503 except a discrete sample 504 having a maximum value among four discrete samples 501, 502, 503 and 504 extracted in the coarse search procedure.

$$z(\alpha)=a\cdot\alpha^2+b\cdot\alpha+c$$

$$z(\beta)=a\cdot\beta^2+b\cdot\beta+c$$

$$z(\gamma)=a\cdot\gamma^2+b\cdot\gamma+c \quad \text{Eq. 3}$$

That is, a quadratic non-linear function z(f) passing three discrete samples 501, 502 and 503 except the discrete sample having the maximum value among four discrete samples extracted in the coarse search procedure is found.

Coefficients a, b and c of the quadratic non-linear function z(f) through a simultaneous equation of the equation 3 can be found. Therefore, the approximated quadratic non-linear function z(f) is as the equation 4.

$$Z(f)=a\cdot f^2+b\cdot f+c \quad \text{Eq. 4}$$

The approximated quadratic non-linear function z(f) expressed as the equation 4 has one maximum point as the equation 5 and the approximated quadratic non-linear function z(f) has a maximum value.

$$f_{maximum\,point}=-b/2a \quad \text{Eq. 5}$$

A value corresponding to a maximum point becomes a carrier wave frequency offset estimation value estimated following the present invention. A conversion relationship between the point having the maximum value and the frequency offset is as shown in table 1.

TABLE 1

| FFT Size | Frequency Offset |
|---|---|
| 0 | −0.5 |
| 1 | −0.49609375 |
| 2 | −0.4921875 |
| 3 | −0.48828125 |
| . | |
| . | |
| . | |
| 252 | 0.48828125 |
| 253 | 0.4921875 |
| 254 | 0.49609375 |
| 255 | 0.5 |

Figure 6:
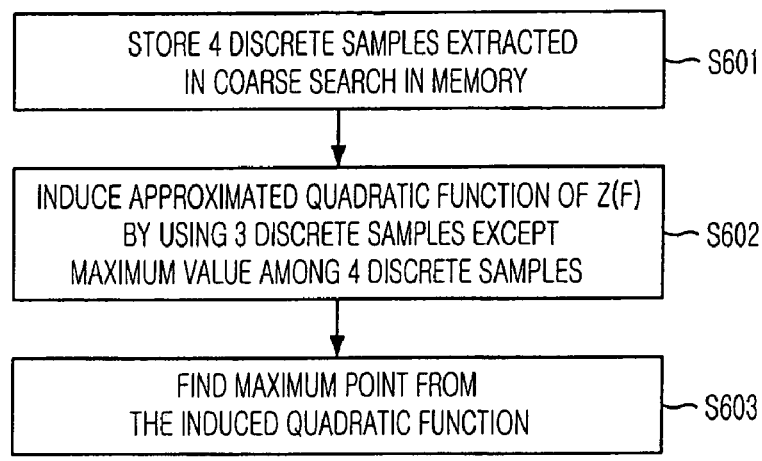
FIG. 6 is a flowchart describing a maximum value detecting procedure based on an approximated quadratic non-linear function in accordance with the embodiment of the present invention.

The above-mentioned carrier wave frequency offset estimating procedure will be described with referring to FIG. 6. FIG. 6 is a flowchart describing a maximum value detecting procedure based on an approximated quadratic non-linear function in accordance with the embodiment of the present invention.

At step S601, four discrete sample values extracted in a coarse search procedure are stored in a memory. At step S602, the approximated quadratic non-linear function is induced by using three discrete sample values except the maximum value among four discrete sample values stored in the memory. At step S603, a maximum point is found from the induced quadratic non-linear function. The found maximum point becomes a carrier wave frequency offset estimation value. Herein, it is apparent to those skilled in the art that discrete samples of more than five numbers are extracted in the coarse search procedure and estimating the carrier wave frequency offset by inducing the quadratic non-linear function by using three discrete sample values except a specific value is possible. However, it is preferred to estimate the carrier wave frequency offset by using three discrete samples, in which the maximum value is excluded after extracting four discrete samples in the coarse search procedure as the embodiment described above in consideration of simplicity and exactness of the estimation.

Figure 7:
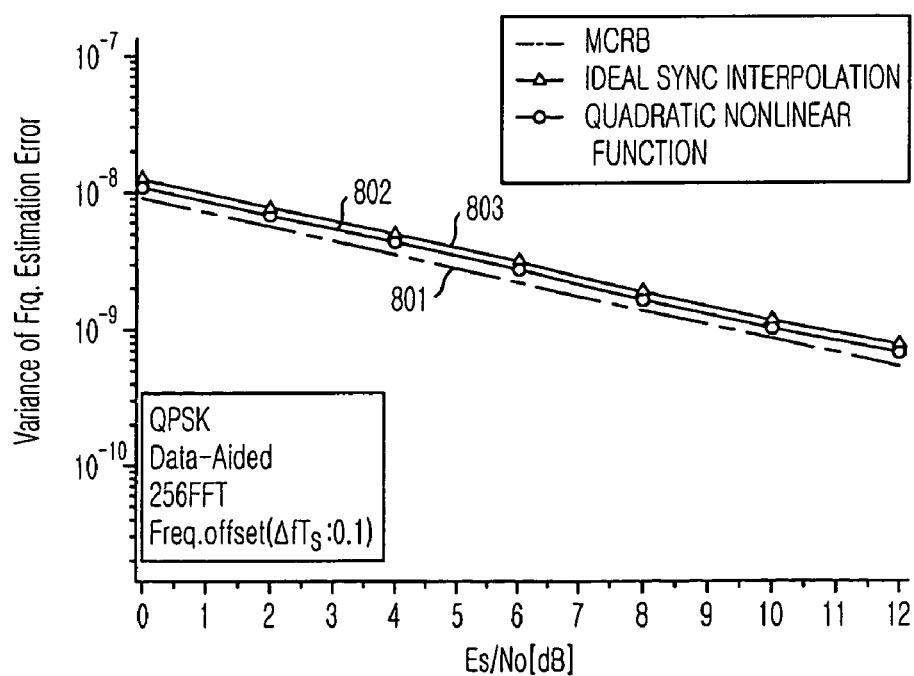
FIG. 7 is a graph showing exactness of carrier wave frequency offset estimation in accordance with the embodiment of the present invention.

FIG. 7 is a graph showing exactness of carrier wave frequency offset estimation in accordance with the embodiment of the present invention. A first performance curve 701 shows the maximum performance at 256 FFT, which is ideally used to detect a frequency offset 0.1. A second performance curve 702 is a performance curve when an ideal sink interpolation filter is introduced, and a third performance curve 703 is a performance curve of a case that the approximated quadratic non-linear function of the present invention is used.

As shown in FIG. 7, estimating the carrier wave frequency offset following the present invention has little performance loss in comparison with a case the carrier wave frequency offset is estimated by introducing the ideal sink interpolation filter.

The carrier wave frequency offset estimating method described above can be equally applied to a case where a doppler frequency offset is estimated.

The present invention can exactly estimate the frequency offset without increasing hardware complexity in estimation of the carrier wave and doppler frequency offset.

The present application contains subject matter related to Korean patent application Nos. 2004-0103061 and 2005-0077356 filed with the Korean Intellectual Property Office on Dec. 8, 2004, and Aug. 23, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for estimating a frequency offset in a communication system, comprising the steps of:

extracting more than three discrete samples from a demodulated signal, where each of the extracted discrete samples has a value greater than a critical value of a power spectrum density function of the demodulated signal;

identifying a subset of the extracted discrete samples, each extracted discrete sample in the subset is closer to the maximum value of the power spectrum density function than any of the extracted discrete samples not in the subset;

interpolating, with a quadratic non-linear function, all of the extracted discrete samples in the subset except a maximal discrete sample that has the maximum value among the extracted discrete samples; and estimating the frequency offset from a maximum point of the quadratic non-linear function.

2. The method as recited in claim 1, wherein the discrete samples are extracted in the order of closeness to the maximum value of the power spectrum density function.

3. The method as recited in claim 1, wherein the power spectrum density function is acquired by performing Discrete Fourier Transform (DFT) or Fast Fourier Transform (FFT) on a discrete signal.

4. The method as recited in claim 1, wherein the number of the extracted discrete samples is four.

5. The method as recited in claim 4, wherein the quadratic non-linear function is formed to pass three of the extracted discrete samples.

6. The method as recited in claim 1, wherein the frequency offset is a carrier wave frequency offset or a doppler frequency offset.

7. A receiver of a communication system, comprising:

a down-converter for down-converting a received RF signal into a baseband signal; and a demodulator for demodulating the baseband signal, wherein the demodulator includes a frequency offset estimator to:

extract more than three discrete samples from the demodulated baseband signal, where each of the extracted discrete samples has a value greater than a critical value of a power spectrum density function of the demodulated baseband signal;

to identify a subset of the extracted discrete samples, each extracted discrete sample in the subset is closer to the maximum value of the power spectrum density function of the demodulated signal than any of the extracted discrete samples not in the subset;

to estimating frequency offset by interpolating all of the extracted discrete samples in the subset except a maximal discrete sample that has the maximum value among the extracted discrete samples; and to estimate a frequency offset from a maximum point of a quadratic non-linear function.

8. The receiver as recited in claim 7, wherein the discrete samples are extracted in the order of closeness to the maximum value of the power spectrum density function.

9. The receiver as recited in claim 7, wherein the power spectrum density function is acquired by performing Discrete Fourier Transform (DFT) or Fast Fourier Transform (FFT) on the baseband signal.

10. The receiver as recited in claim 7, wherein the number of the extracted discrete samples is four.

11. The receiver as recited in claim 10, wherein the quadratic non-linear function is formed to pass three of the extracted discrete samples.

12. The receiver as recited in claim 7, wherein the frequency offset is a carrier wave frequency offset or a doppler frequency offset.

* * * * *